US008350818B2

(12) United States Patent
Fritzley et al.

(10) Patent No.: US 8,350,818 B2
(45) Date of Patent: Jan. 8, 2013

(54) TOUCH-SENSITIVE DISPLAY METHOD AND APPARATUS

(76) Inventors: Eric Fritzley, Waterloo (CA); Rohit Rockey Jain, Waterloo (CA); Adrian Michael Logan, Waterloo (CA); Michael Thomas Hardy, Waterloo (CA)

( * ) Notice: Subject to any disclaimer, the term of this patent is extended or adjusted under 35 U.S.C. 154(b) by 521 days.

(21) Appl. No.: 12/618,183

(22) Filed: Nov. 13, 2009

(65) Prior Publication Data

US 2011/0115716 A1      May 19, 2011

(51) Int. Cl.
*G06F 3/041* (2006.01)
(52) U.S. Cl. ........................................ 345/173
(58) Field of Classification Search .................. None
See application file for complete search history.

(56) References Cited

U.S. PATENT DOCUMENTS

| 2006/0022955 A1* | 2/2006 | Kennedy ...................... 345/173 |
| 2007/0120834 A1* | 5/2007 | Boillot ........................ 345/173 |
| 2008/0062145 A1* | 3/2008 | Shahoian et al. ............. 345/173 |

OTHER PUBLICATIONS

Canadian Office Action, Canadian Application 2686570, dated Jun. 26, 2012, 4 pages.

* cited by examiner

*Primary Examiner* — Adam R Giesy

(57) ABSTRACT

A method includes detecting a continuous touch on a touch-sensitive display. A position of one or more boundaries is updated when the continuous touch crosses a first boundary of the one or more boundaries. Feedback is provided when the continuous touch crosses the first boundary.

26 Claims, 5 Drawing Sheets

TOUCH-SENSITIVE DISPLAY METHOD AND APPARATUS

FIELD OF TECHNOLOGY

The present disclosure relates to touch-sensitive displays, including, but not limited to, portable electronic devices having touch-sensitive displays.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities. These devices run on a wide variety of networks from data-only networks such as Mobitex® and DataTAC® networks to complex voice and data networks such as GSM/GPRS, CDMA, EDGE, UMTS and CDMA2000 networks.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
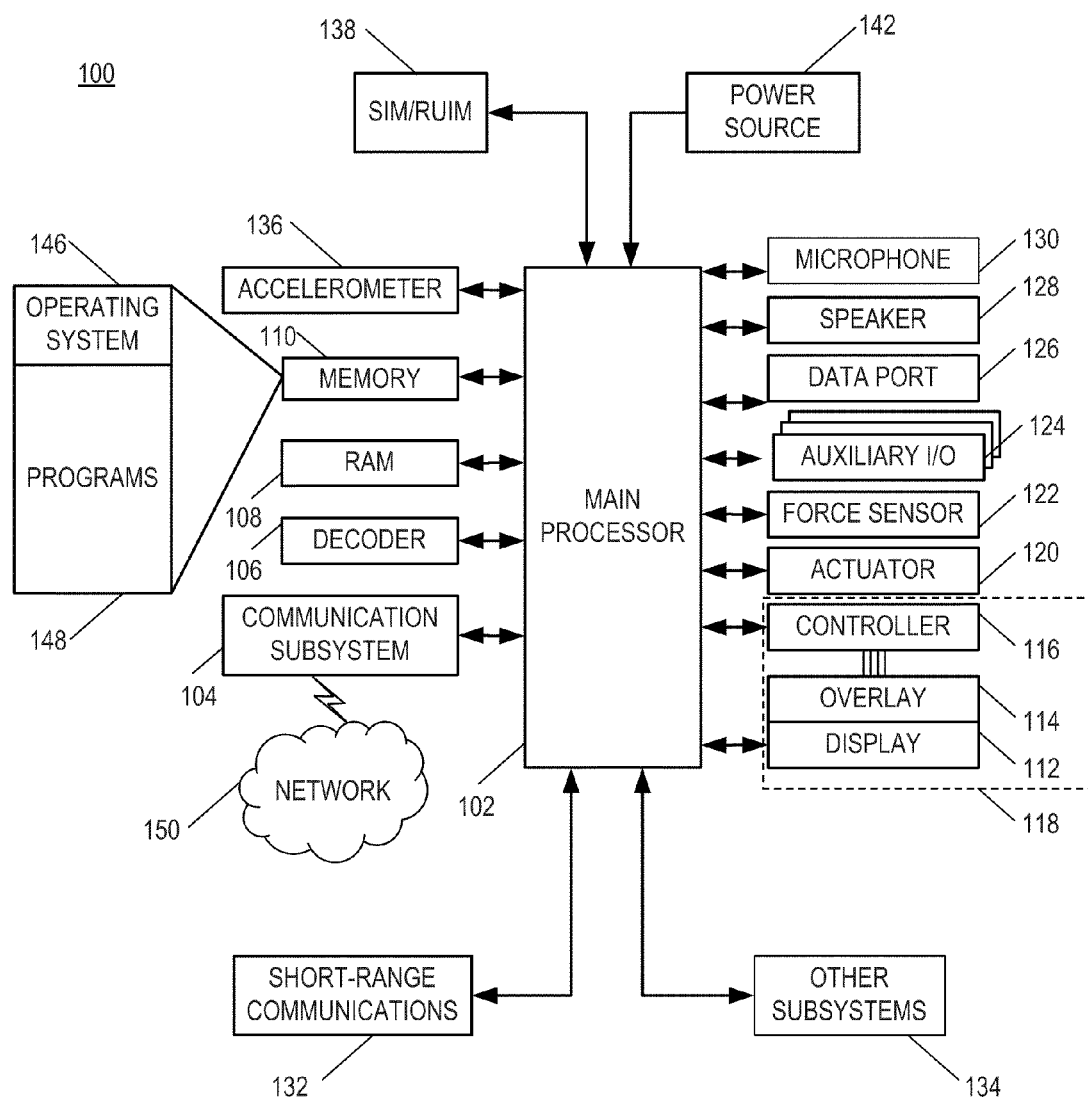
FIG. 1 is a block diagram of a portable electronic device in accordance with the present disclosure.
Figure 2:
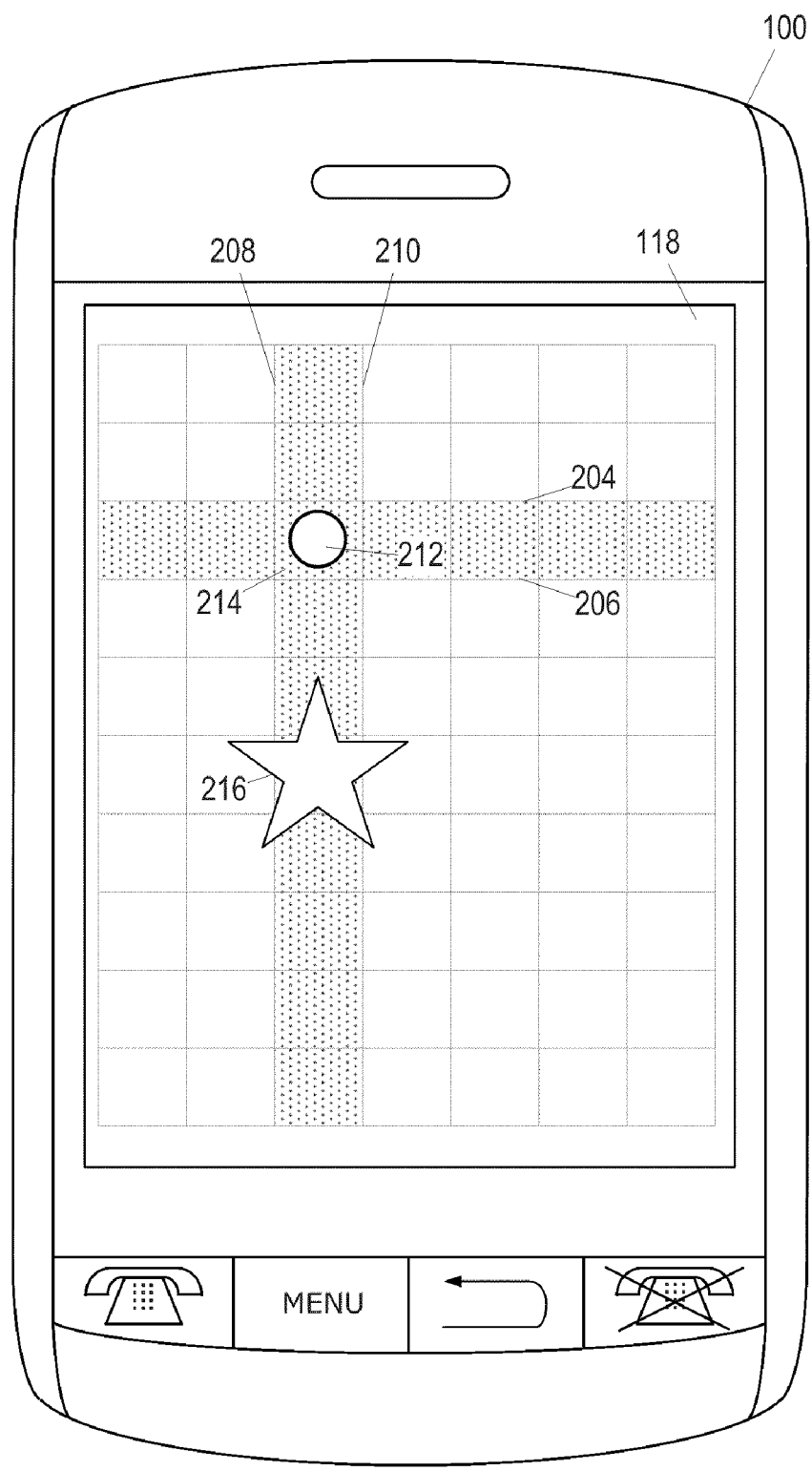
FIG. 2, FIG. 3, FIG. 4, FIG. 5, and FIG. 6 illustrate an example of updating boundaries and providing feedback for a touch-sensitive display in accordance with the present disclosure.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smart-phones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118 and processed by the processor 102, for example, to determine a location of a touch. Touch location data may include a single point of contact, such as a point at or near a center of the area of contact, or the entire area of contact for further processing. The location of a touch detected on the touch-sensitive display 118 may include x and y components, e.g., horizontal and vertical with respect to one's view of the touch-sensitive display 118, respectively. For example, the x location component may be determined by a signal generated from one touch sensor, and the y location component may be determined by a signal generated from another touch sensor. A signal is provided to the controller 116 in response to detection of a suitable object, such as a finger, thumb, or other items, for example, a stylus, pen, or other pointer, depending on the nature of the touch-sensitive display 118. More than one simultaneous location of contact may occur and be detected.

The actuator 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 provides the user with tactile feedback. When a mechanical dome switch actuator is utilized, tactile feedback is provided when the dome collapses due to imparted force and when the dome returns to the rest position after release of the switch.

Alternatively, the actuator 120 may comprise one or more piezoelectric (piezo) devices that provide tactile feedback for the touch-sensitive display 118. Contraction of the piezo actuator(s) applies a spring-like force, for example, opposing a force externally applied to the touch-sensitive display 118. Each piezo actuator includes a piezoelectric device, such as a piezoelectric ceramic disk adhered to a metal substrate. The metal substrate bends when the piezoelectric disk contracts due to build up of charge at the piezoelectric disk or in response to a force, such as an external force applied to the touch-sensitive display 118. The charge may be adjusted by varying the applied voltage or current, thereby controlling the force applied by the piezo disks. The charge on the piezo actuator may be removed by a controlled discharge current that causes the piezoelectric disk to expand, releasing the force thereby decreasing the force applied by the piezo disks. The charge may advantageously be removed over a relatively short period of time to provide tactile feedback. Absent an external force and absent a charge on the piezo disk, the piezo disk may be slightly bent due to a mechanical preload.

Touch-sensitive displays that provide for scrolling or panning of information displayed on the display area of the touch-sensitive display in response to a movement of a touch are known. A location of a touch that is continuously detected, i.e., a continuous touch, may follow a path along the touch-sensitive display and the portable electronic device 100 may provide visual, audible, and/or tactile feedback. For example, the device 100 may provide visual feedback by scrolling, panning, or otherwise manipulating information displayed on the screen in response to the continuous touch. The path of the continuous touch may include subtle variations that are not intended to scroll or pan through the information in the direction of the subtle variations of the movement. For example, a natural motion of a path of a continuous touch that is intended to be in a vertical direction may be in an arc or on a diagonal instead of in a straight vertical line. Such a path, although substantially in a vertical direction, may contain small unintended movements in a horizontal direction. In another example, a path of a continuous touch may be in a substantially horizontal direction and contain subtle variations in a vertical direction that were not intended. The terms "horizontal" and "vertical" are utilized herein only to provide reference to one's view of the drawings and are not otherwise limiting.

An example of establishing and updating boundaries and providing feedback for a touch-sensitive display is illustrated by tracking a single continuous touch in FIG. 2, FIG. 3, FIG. 4, FIG. 5, and FIG. 6. The portable electronic device 100 may display information in any type of application or program, including grid-based applications, such as a spreadsheet program, a calendar program, or any other program that presents information 100 in a form that may include rows, columns, cells, and so forth. The device 100 detects a touch originating at a location 212 that is located within a cell 214. Based on the location 212 of the touch in the cell 214, multiple boundaries 204, 206, 208, 210 are established such that the location 212 is situated between horizontal boundaries 208 and 210 and vertical boundaries 204 and 206. The boundaries 204, 206, 208, 210 are depicted as lines. The boundaries are utilized to determine when the information displayed on the touch-sensitive display 118 is changed.

The vertical boundaries 204 and 206 are illustrated as separated by a distance that is the height of one cell, although any suitable height or distance between vertical boundaries 204 and 206 may be utilized. When a touch crosses a boundary, the information displayed may be changed. When the touch crosses the vertical boundary 206 in this example, the information displayed in the cells is shifted down one row such that the information moves in conjunction with and based at least in part on a movement of a touch. Optionally, the area between boundaries, which is shaded in FIG. 2, may be shaded or highlighted to emphasize where the boundaries are located on the touch-sensitive display 118 of the portable electronic device 100.

Similarly, the horizontal boundaries 208 and 210 are illustrated as separated by a distance that is the width of one cell, although any suitable width or distance between the horizontal boundaries 208 and 210 may be utilized. When the touch crosses the horizontal boundary 210, information displayed on the display 118 may be changed to shift the information to the right by one column such that the information moves along with the touch.

Figure 3:
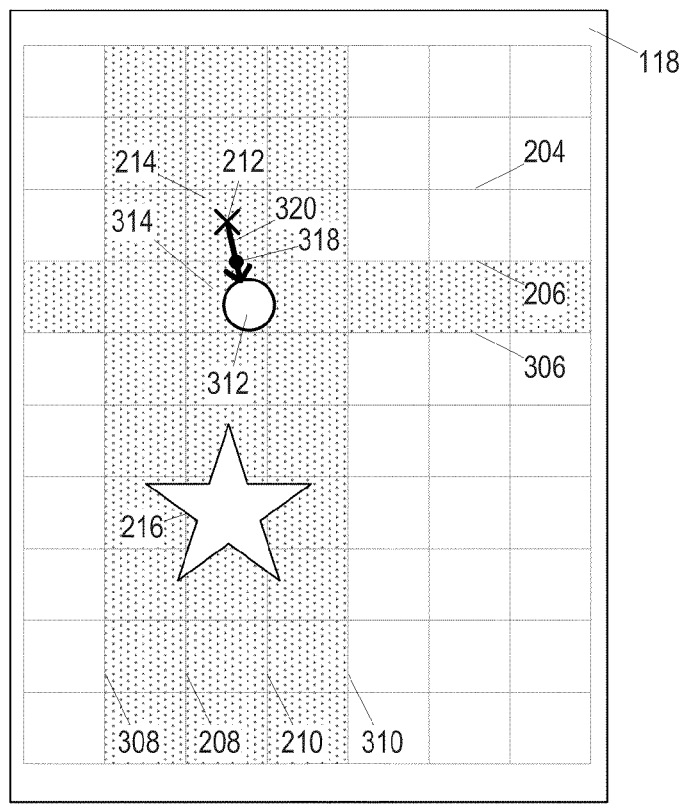

The touch originally detected at location 212 is continuously detected along the path 320 to a location 312 in cell 314, as shown in FIG. 3. The path 320 of the continuous touch is substantially in a vertical direction and also comprises nominal movement in a horizontal direction. When the continuous touch crosses the vertical boundary 206 at point 318, the positions of the boundaries are updated. As shown, the initial horizontal boundaries 208 and 210 are expanded to updated horizontal boundaries 308 and 310 that are expanded to three cell widths apart. While the expanded boundaries are separated by three cell widths, any width or distance may be utilized. Alternative embodiments may reduce the distance between the boundaries instead of increasing the distance between the boundaries.

The vertical boundaries 204 and 206 are updated to new vertical boundaries 206 and 306. As shown, the positions of the boundaries are updated, e.g., from vertical boundaries 204 and 206 to vertical boundaries 206 and 306, while the distance between the boundaries remains the same.

The information displayed may also change. For example, a star 216 is displayed to represent the information, which may shift down in response to movement of the touch.

Figure 4:
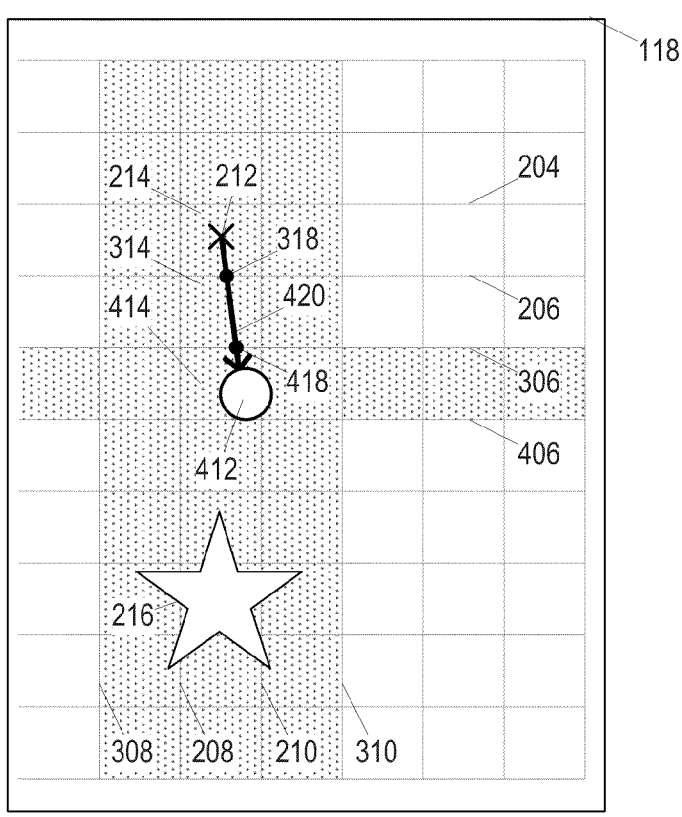

The touch originally detected at location 212 is continuously detected along the path 420 to a location 412 in cell 414, as shown in FIG. 4. The path 420 of the continuous touch is substantially in a vertical direction and also comprises nominal movement in a horizontal direction. When the continuous touch crosses the vertical boundary 306 at point 418, the positions of the boundaries are updated.

The horizontal boundaries 308 and 310 remain at the same position and are separated by the same distance as in FIG. 3, although these boundaries may optionally be further expanded or reduced (not shown). Also, the vertical boundaries 206 and 306 are updated to new vertical boundaries 306 and 406. As shown, the positions of the boundaries are updated, e.g., from the vertical boundaries 206 and 306 to the vertical boundaries 306 and 406, while the distance between the boundaries remains the same. As discussed above, the information displayed may change, e.g., by shifting the information, e.g., the star 216, down one cell height in conjunction with and in response to the movement indicated by location data associated with a touch.

Figure 5:
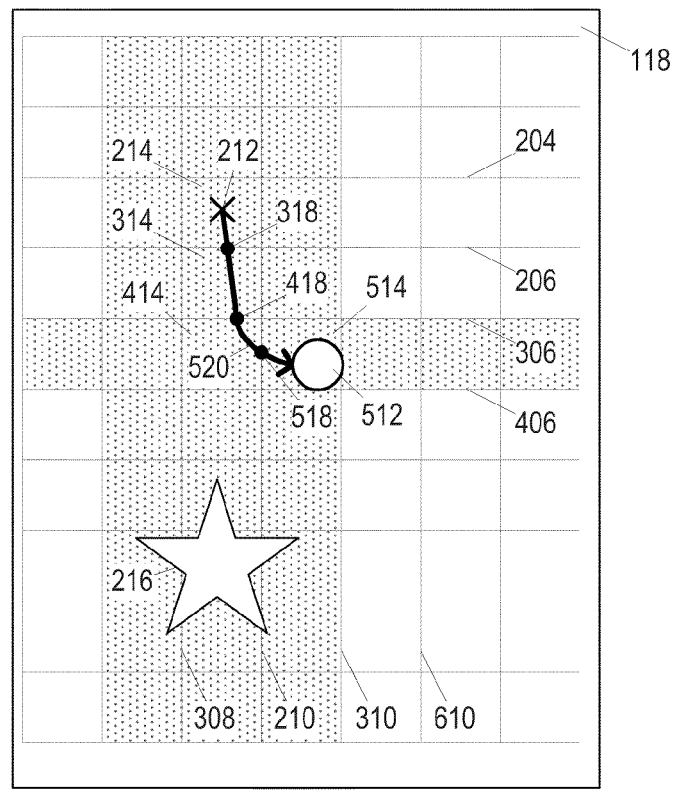

The touch originally detected at location 212, is continuously detected along the path 520 to location 512 in a cell 514, as shown in FIG. 5. The path 520 of the continuous touch is substantially in a vertical direction and also comprises movement in a horizontal direction. Because no boundary was crossed, the information displayed and the positions of the boundaries 308, 310, 306, and 406 are not changed or updated.

Figure 6:
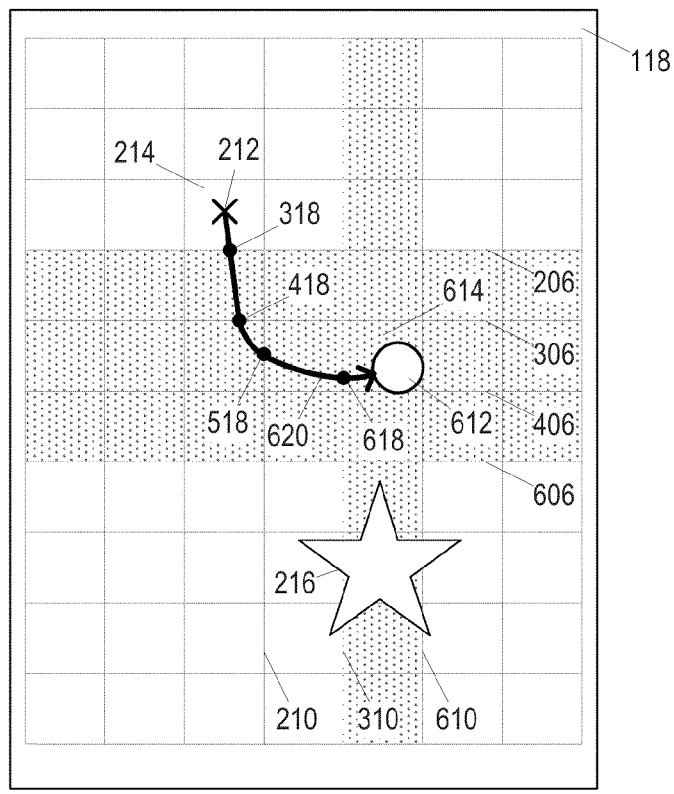

The touch originally detected at location 212 is continuously detected along the path 620 to a location 612 in a cell 614, as shown in FIG. 6. The path 620 of the continuous touch is initially in a substantially vertical direction and subsequently alters to a substantially horizontal direction. When the continuous touch crosses the horizontal boundary 308 at point 618, the positions of the boundaries are updated.

As shown, the horizontal boundaries 308 and 310 are updated to new horizontal boundaries 310 and 610, such that the distance between the horizontal boundaries is reduced to one cell width. While the reduced distance is shown to be one cell width, any suitable width or distance may be utilized.

The vertical boundaries 306 and 406 are also updated to new vertical boundaries 206 and 606, such that the vertical boundaries are expanded to three cell heights apart. While the expanded distance is three cell heights, any suitable height or distance may be utilized.

The information displayed may also change with the change in boundaries. For example, the information, e.g., the star 216 may shift to the right by two cell widths in conjunction with and/or in response to the movement of the touch.

Figure 7:
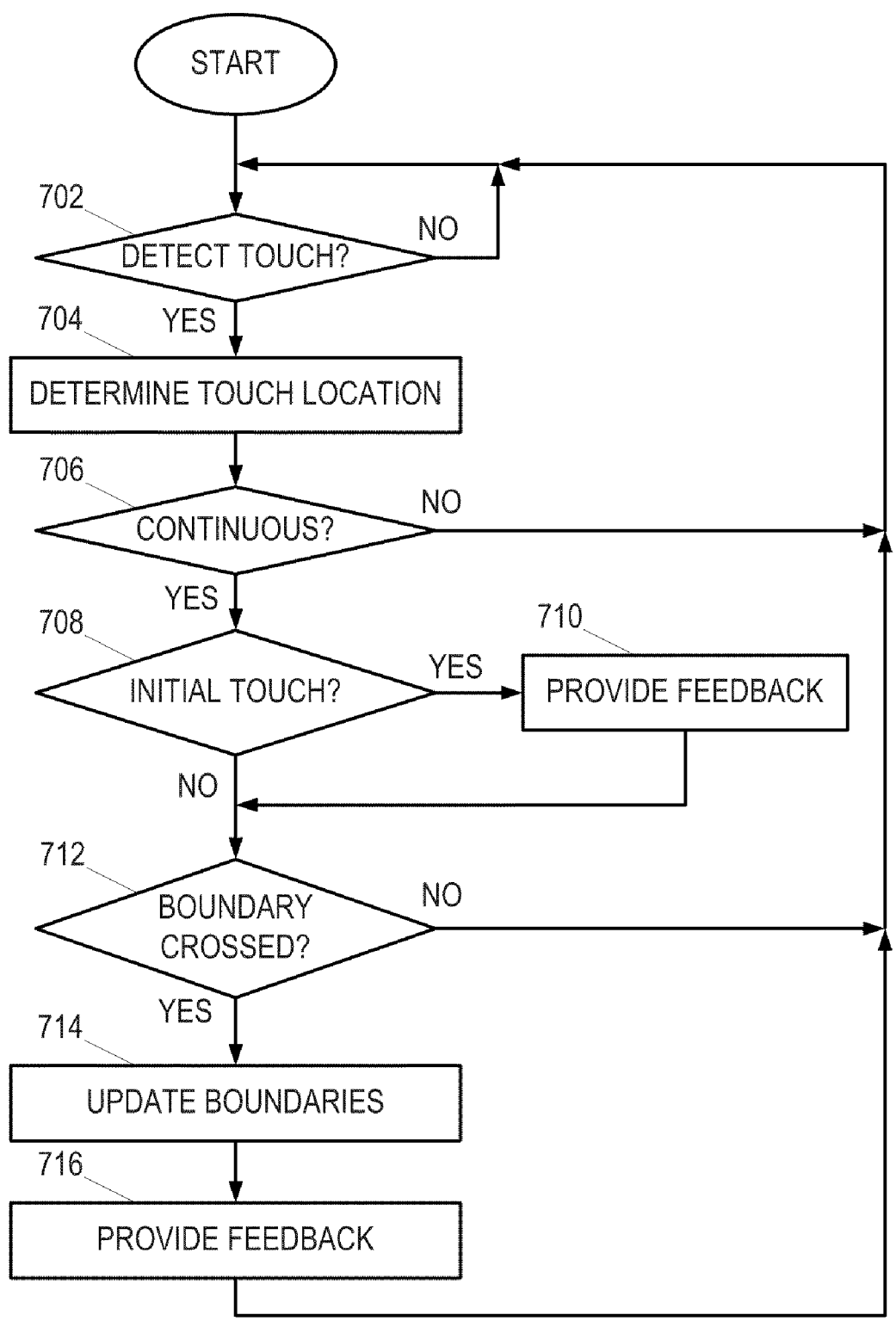
FIG. 7 illustrates a flowchart of a method for updating one or more boundaries and providing feedback for a touch-sensitive display in accordance with the present disclosure.

A method for updating one or more boundaries and providing feedback for a touch-sensitive display is illustrated in the flowchart of FIG. 7. One or more processors, such as the controller 116, the processor 102, and so forth, may be configured to perform the method of FIG. 7 through the use of software executed by the one or more processors. Coding of software for carrying out such a method is within the scope of a person of ordinary skill in the art given the present description. The method is described with respect to the portable electronic device 100 of FIG. 1, although the flowchart may apply to any electronic device comprising a touch-sensitive display.

When a touch is detected at 702, a location of the touch on the touch-sensitive display 118 is determined from the location data at 704. The location of a touch may reference a center of a touch, a leading point or edge of a touch, a trailing point or edge of a touch, and so forth.

Whether the location data is continuous is determined at 706, i.e., whether the location data is indicative of a continuous touch on the touch-sensitive-display 118. When the touch is not continuous, for example, when the touch-sensitive display 118 is initially touched, an impulse touch or tap, or when a formally continuous touch ends, the process continues at 702.

When the touch is an initial touch at 708, feedback is provided at 710. The feedback may be visual, audible, tactile, and so forth, or any combination thereof. Visual feedback may include changing the information displayed by displaying the one or more boundaries, highlighting one or more areas of the information on various sides of the boundaries, changing information displayed by shifting information up, down, left, or right on the display, and so forth. Audible feedback may comprise any sound, for example a sound provided by the speaker 128 or actuator 120. Tactile feedback may comprise, for example, any tactile pulse and/or vibration that may be provided by the actuator 120. For example, when a touch-sensitive display 118 is initially touched, the touch-sensitive display 118 may display one or more boundaries on the display 112, an audible beep may be played, and a vibration may be applied.

When the touch is not an initial touch at 708, the process continues at 712. When a boundary is crossed at 712, one or more boundaries are updated. A boundary may be crossed, for example, when the location data indicates that the touch crossed one or more boundaries, e.g., the boundaries 204, 206, 208, 210 of FIG. 2. The crossing of a boundary need not be precisely detected. A boundary crossing may be determined when a touch is detected on one side of a boundary and subsequently is detected on another side of the boundary.

One or more boundaries are updated at 714. Updating of the boundaries may be based on the location of the touch. The positions of the boundaries may be set to a predetermined distance from the location of a touch. Other examples of boundary updates are described above.

Updating one or more of the boundaries may include increasing or decreasing a distance between a pair of the one or more boundaries. Additionally, a first distance between a first pair of one or more boundaries may be increased and a second distance between a second pair of the one or more boundaries may be decreased, as illustrated in the transition from FIG. 5 to FIG. 6, wherein the distance is increased between the vertical boundaries, e.g., from the boundaries 306 and 406 to the boundaries 206 and 606, and the distance is reduced between the horizontal boundaries, e.g., from the boundaries 308 and 310 to the boundaries 310 and 610.

Feedback is provided at 716. The feedback may be any of visual, audible, and/or tactile feedback, such as described above. The processes of updating boundaries at 714 and providing feedback at 716 may happen in any order or at least partially simultaneously. Additionally, other processes may be added to or removed from the flowchart and the order, and timing may be different than that shown in FIG. 7.

While the above description relates to the example of a grid-based displays of information, the teachings of the disclosure may be applied to information not displayed in a grid. For example, an application that displays images on a touch-sensitive display may utilize the teachings of the disclosure. Such images may include photographs or web pages. For such images, instead of relating the boundaries to cells in a grid, any suitable unit of measure may be utilized to update the boundaries, such as one or more pixels. Devices incorporating the teachings of the disclosure advantageously provide for panning, shifting, or moving information in manner that is less sensitive to unintended movements.

Additionally, embodiments incorporating the teachings of the disclosure may comprise one or more computer readable media that cause one or more processors to perform the teachings of the disclosure. Such computer-readable media may include, but are not limited to, CDs, DVDs, read-only memory, random-access memory, memory caches, and so forth.

A method comprises detecting a continuous touch on a touch-sensitive display and updating a position of one or more boundaries when the continuous touch crosses a first boundary of the one or more boundaries. Feedback is provided when the continuous touch crosses the first boundary.

A portable electronic device comprises a touch-sensitive display and one or more processors configured to detect a continuous touch, update a position of one or more boundaries when the continuous touch crosses a first boundary of the one or more boundaries, and provide feedback when the continuous touch crosses the first boundary.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   detecting a touch at a first location on a touch-sensitive display;
   determining position of a pair of horizontal boundaries and position of a pair of vertical boundaries based on the first location of the touch, such that the first location of the touch is between the pair of horizontal boundaries and the pair of vertical boundaries, and wherein information displayed on the touch-sensitive display changes when one of the boundaries is crossed by the touch;
   changing the position of at least one of the boundaries when the touch continues and crosses a first boundary of the one or more boundaries;
   providing feedback when the touch crosses the first boundary.

2. The method of claim 1, wherein providing feedback comprises changing information displayed on the touch-sensitive display based on location of the touch.

3. The method of claim 1, wherein changing comprises increasing a first distance between a first pair of the one or more boundaries and decreasing a second distance between a second pair of the one or more boundaries.

4. The method of claim 3, further comprising when the touch continues and crosses a second boundary of the boundaries, reducing the first distance between the first pair of the boundaries and increasing the second distance between the second pair of the boundaries.

5. The method of claim 1, wherein the changing is based at least in part on location of the touch.

6. The method of claim 1, further comprising providing at least one of visual feedback, audible feedback, or tactile feedback when the touch continues and crosses the first boundary.

7. The method of claim 6, wherein providing at least one of visual feedback, audible feedback, or tactile feedback is based at least in part on location of the touch.

8. The method of claim 7, wherein the visual feedback comprises shading or highlighting an area between at least two of the boundaries.

9. The method of claim 1, further comprising displaying a first image before the touch crosses a first boundary and panning the image when the touch crosses the first boundary.

10. The method of claim 1, wherein changing comprises increasing a distance between the pair of horizontal boundaries when the touch continues and crosses one of the vertical boundaries.

11. The method of claim 1, wherein changing comprises decreasing a distance between the pair of horizontal boundaries when the touch continues and crosses one of the vertical boundaries.

12. A computer-readable storage device having computer-readable code executable by at least one processor to perform the method of claim 1.

13. The method of claim 1, wherein changing comprises changing position of the pair of vertical boundaries and maintaining position of the pair of horizontal boundaries when the touch continues and crosses one of the vertical boundaries.

14. The method of claim 1, wherein changing comprises changing position of the pair of horizontal boundaries and maintaining position of the pair of vertical boundaries when the touch continues and crosses one of the horizontal boundaries.

15. The method of claim 1, wherein changing comprises increasing a distance between the pair of vertical boundaries when the touch continues and crosses one of the pair of horizontal boundaries.

16. The method of claim 1, wherein changing comprises decreasing a distance between the pair of vertical boundaries when the touch continues and crosses one of the pair of horizontal boundaries.

17. A portable electronic device comprising:
   a touch-sensitive display;
   one or more processors configured to:
      detect a touch at a first location on the touch-sensitive display;
      determine position of a pair of horizontal boundaries and position of a pair of vertical boundaries based on the first location of the touch, such that the first location of the touch is between the pair of horizontal boundaries and the pair of vertical boundaries, and wherein the boundaries are utilized to determine when information displayed on the touch-sensitive display is changed;
      change the position of one of the pairs of boundaries when the touch continues and crosses a first boundary of the one or more boundaries;
      provide feedback when the touch crosses the first boundary.

18. The portable electronic device of claim 17, wherein to provide the feedback, the one or more processors are configured to change information displayed on the touch-sensitive display based on location of the touch.

19. The portable electronic device of claim 17, wherein to change the position of the boundaries, the one or more processors are configured to increase a first distance between a first pair of the one or more boundaries and decrease a second distance between a second pair of the one or more boundaries.

20. The portable electronic device of claim 19, wherein the one or more processors are further configured to, when the touch continues and crosses a second boundary of the boundaries, reduce the first distance between the first pair of the boundaries and increase the second distance between the second pair of the boundaries.

21. The portable electronic device of claim 17 wherein the change is based at least in part on location of the touch.

22. The portable electronic device of claim 17, wherein the one or more processors are further configured to provide at least one of visual feedback, audible feedback, or tactile feedback when the touch continues and crosses one of the first boundary.

23. The portable electronic device of claim 22, wherein the visual feedback comprises displaying the boundaries on the touch-sensitive display, the audible feedback comprises a beep, and the tactile feedback comprises vibrating at least a part of the portable electronic device.

24. The portable electronic device of claim 17, wherein the one or more processors are further configured to display a first image before the touch crosses a first boundary and pan the image when the touch crosses the first boundary.

25. The portable electronic device of claim 17, wherein the one or more processors are further configured to change position of the pair of vertical boundaries and maintain position of the pair of horizontal boundaries when the touch continues and crosses one of the vertical boundaries.

26. The portable electronic device of claim 17, wherein the one or more processors are further configured to change position of the pair of horizontal boundaries and maintain position of the pair of vertical boundaries when the touch continues and crosses one of the horizontal boundaries.

* * * * *